A. D. STEVEN.
FENDER FOR AUTOMOBILES.
APPLICATION FILED SEPT. 30, 1914.
1,127,308.
Patented Feb. 2, 1915.
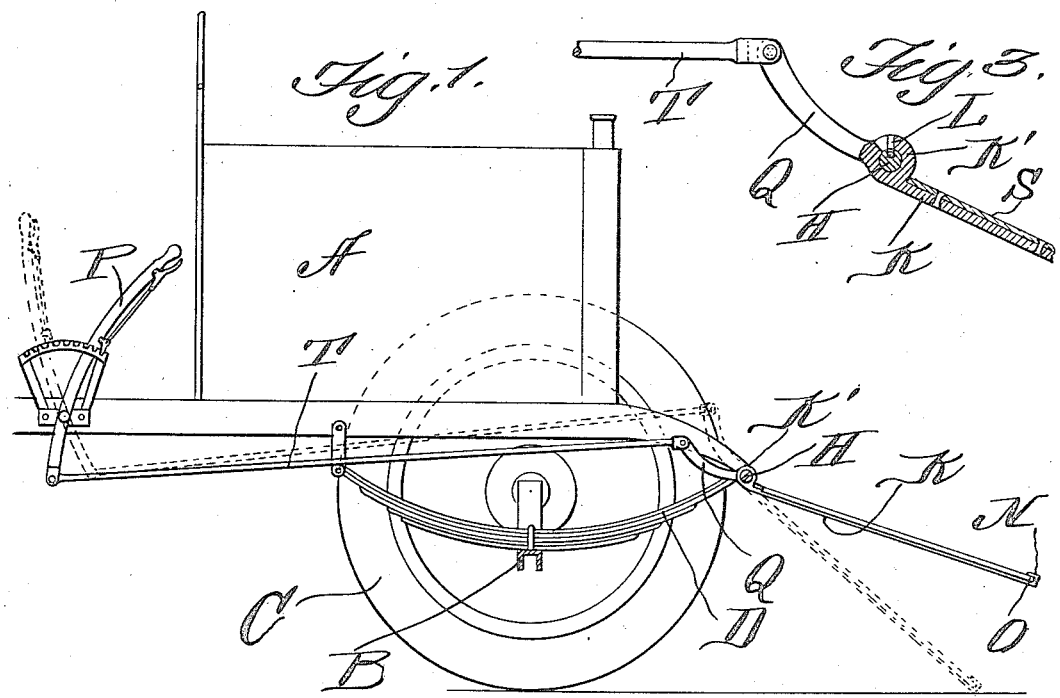
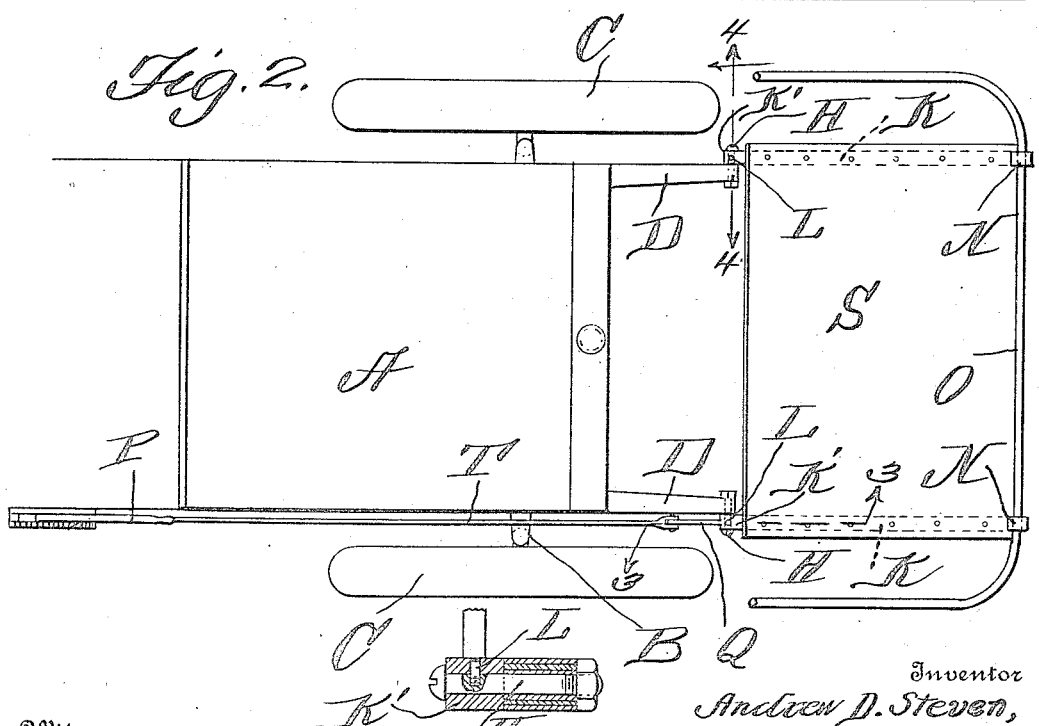

UNITED STATES PATENT OFFICE.

ANDREW DOWNIE STEVEN, OF EAST ROCHESTER, NEW YORK.

FENDER FOR AUTOMOBILES.

1,127,308.

Specification of Letters Patent.

Patented Feb. 2, 1915.

Application filed September 30, 1914. Serial No. 864,283.

*To all whom it may concern:*

Be it known that I, ANDREW D. STEVEN, a citizen of the United States, residing at East Rochester, in the county of Monroe and State of New York, have invented certain new and useful Improvements in Fenders for Automobiles; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in fenders for automobiles and consists of a simple and efficient device of this nature so arranged that the fender may be thrown down through the medium of a lever to catch an obstruction, means being provided for limiting the swinging movement of the fender in different directions.

My invention comprises other details of construction, combinations and arrangements of parts which will be hereinafter fully described, shown in the accompanying drawings and then specifically defined in the appended claim.

I illustrate my invention in the accompanying drawings, in which:

Figure 1 is a side elevation of a fender made in accordance with my invention. Fig. 2 is a top plan view, and Fig. 3 is a sectional view on line 3—3 of Fig. 2; and Fig. 4 is a vertical detail sectional view on the line 4—4 of Fig. 2.

Reference now being had to the details of the drawings by letter, A designates the body of an automobile and B the forward axle on which the wheels C are mounted.

D designates springs at the forward ends of which eyes are formed, and H designates pivotal screws rigidly fixed one in each of said eyes, and bars K have eyes K' therein journaled one upon each of said pivotal screws and each eye K' has an elongated slot formed radially therein and through which a pin L passes which is fastened to said pivotal screw and coöperates with the slot to limit the swinging movement of the bar K. Each bar has a forwardly projecting arm terminating in an eye N and the two eyes N carry a fender bar O. The fender board S is fixed to the forwardly projecting arms of the bars K and Q designates an arm projecting from one of said bars K and to which the link T is connected, which in turn is pivotally fastened to the lower end of the operating lever P.

By the provision of a fender made in accordance with my invention, it will be noted that, instead of having the fender rigidly held in a certain position upon the automobile, I provide means whereby the fender may be tilted down at an angle in order to scoop up an obstruction rather than to knocking it down, as would be the case if the fender were projected forward in a fixed position, the pivotal pins serving to limit the movement of the fender in opposite directions.

What I claim to be new is:

In combination with a vehicle frame, springs thereon having eyes at their forward ends, a screw rigidly fastened in each eye and having a hole in its circumference, a fender having bars fixed thereto, each bar terminating at one end in an eye and a slot in its wall, a pin passing through a slot in the wall of the eye of the bar and engaging the hole in the screw, an arm fixed to one of said eyes of the fender, and a lever pivotally connected to said arm.

In testimony whereof I hereunto affix my signature in presence of two witnesses.

ANDREW DOWNIE STEVEN.

Witnesses:
DAVID T. PLUNKET,
JAMES HOOD.